United States Patent
Meier et al.

(10) Patent No.: US 11,281,480 B2
(45) Date of Patent: Mar. 22, 2022

(54) ENHANCING PARAMETER-LESS EXIT-CALLS FROM A COMMAND LINE INTERFACE

(71) Applicant: SAP SE, Walldorf (DE)

(72) Inventors: Andreas Meier, Wilhermsdorf (DE); Thomas Grimmeisen, Bad Schönborn (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/886,090

(22) Filed: May 28, 2020

(65) Prior Publication Data

US 2021/0373922 A1  Dec. 2, 2021

(51) Int. Cl.
| | | |
|---|---|---|
| *G06F 9/455* | (2018.01) | |
| *G06F 11/34* | (2006.01) | |
| *G06F 9/54* | (2006.01) | |
| *G06F 11/36* | (2006.01) | |

(52) U.S. Cl.
CPC .......... *G06F 9/45512* (2013.01); *G06F 9/541* (2013.01); *G06F 11/3419* (2013.01); *G06F 11/3664* (2013.01)

(58) Field of Classification Search
CPC .. G06F 9/45512; G06F 9/541; G06F 11/3419; G06F 11/3664
USPC ................................................. 717/124–140
See application file for complete search history.

(56) References Cited

U.S. PATENT DOCUMENTS

| | | | | |
|---|---|---|---|---|
| 5,390,314 A | * | 2/1995 | Swanson | G06F 9/45512 717/138 |
| 6,658,646 B1 | * | 12/2003 | Hernandez, III | G06F 9/45512 717/114 |
| 6,668,368 B1 | * | 12/2003 | Hernandez, III | G06F 8/30 717/115 |
| 7,290,263 B1 | * | 10/2007 | Yip | G06F 8/38 717/121 |
| 7,328,243 B2 | * | 2/2008 | Yeager | H04L 29/06 707/999.008 |
| 7,502,999 B1 | * | 3/2009 | Saiyed | G06F 8/73 715/205 |
| 7,818,726 B2 | * | 10/2010 | Snover | G06F 9/45512 717/139 |

(Continued)

OTHER PUBLICATIONS

Glaser et al., "The Next Generation of Command Line Interfaces", IEEE, pp. 29-36 (Year: 1995).*

(Continued)

*Primary Examiner* — Anil Khatri
(74) *Attorney, Agent, or Firm* — Sterne, Kessler, Goldstein & Fox P.L.L.C.

(57) ABSTRACT

Disclosed herein are system, method, and computer program product embodiments for enhancing parameter-less exit-calls from a command line interface (CLI). An embodiment operates by obtaining a parameter and a name for a task script, and then generating a shell script including the name of the task script and an instruction to execute the task script based on the parameter. Then, an execution request for a task including an exit-call is sent to the CLI. The execution request includes a name of the shell script for the exit-call. The CLI calls the shell script in response to the exit-call during execution of the task. Further, the task script is executed based on the parameter in response to the CLI calling the shell script.

19 Claims, 4 Drawing Sheets

(56) References Cited

U.S. PATENT DOCUMENTS

| | | | | |
|---|---|---|---|---|
| 8,225,288 | B2* | 7/2012 | Miller | G06F 11/3672 |
| | | | | 717/124 |
| 8,248,958 | B1* | 8/2012 | Tulasi | H04L 43/50 |
| | | | | 370/250 |
| 8,745,489 | B2* | 6/2014 | McCollum | H04L 67/08 |
| | | | | 715/268 |
| 9,021,117 | B1* | 4/2015 | Pellowski | H04L 67/2823 |
| | | | | 709/230 |
| 9,092,143 | B1* | 7/2015 | Bappe | G06F 11/3419 |
| 9,219,742 | B2* | 12/2015 | Hsiung | G06F 21/6227 |
| 9,384,184 | B2* | 7/2016 | Acuna | G06F 16/3346 |
| 9,565,202 | B1* | 2/2017 | Kindlund | G06F 21/567 |
| 9,935,959 | B2 | 4/2018 | Keith et al. | |
| 10,129,232 | B1* | 11/2018 | Phuong | G06F 11/362 |
| 10,635,566 | B1* | 4/2020 | Talluri | G06F 11/3404 |
| 10,732,962 | B1* | 8/2020 | Florescu | G06F 11/0751 |
| 10,915,697 | B1* | 2/2021 | Guliak | G06N 3/08 |
| 10,956,477 | B1* | 3/2021 | Fang | G06F 21/563 |
| 10,996,973 | B2* | 5/2021 | Stanley | G06F 9/45512 |
| 2011/0225565 | A1 | 9/2011 | van Velzen et al. | |
| 2015/0089001 | A1 | 3/2015 | Mordani et al. | |
| 2015/0304161 | A1 | 10/2015 | Nguyen et al. | |
| 2016/0124832 | A1 | 5/2016 | Kumar et al. | |
| 2018/0060216 | A1 | 3/2018 | Kasi et al. | |
| 2019/0286547 | A1 | 9/2019 | Ramraz | |

OTHER PUBLICATIONS

Greenberg, "Word Expansion Supports POSIX Shell Interactivity", ACM, pp. 153-160 (Year: 2018).*

Bland et al, "Design and Implementation of a Menu Based OSCAR Command Line Interface", IEEE, pp. 1-5 (Year: 2007).*

Solomon et al., "Automated Testing of Unix Command-line and Scripting Skills", IEEE, pp. 1-6 (Year: 2006).*

Sampth et al, "Accessibility of Command Line Interfaces", ACM, pp. 1-10 (Year: 2021).*

Nelms, "Scripting Repetitive Research Tasks", ACM, pp. 199-205 (Year: 2011).*

Hassan et al, "Script based Text Identification: A Multi-level Architecture", ACM, pp. 1-8 (Year: 2011).*

Zhou et al., "Multi-Task Self-Supervised Learning for Script Event Prediction", ACM, pp. 3662-3666 (Year: 2021).*

Kim et al, "Multiple Script-based Task Model and Decision/Interaction Model for Fetch-and-carry Robot", IEEE, pp. 815-820 (Year: 2007).*

Sugimoto et al., "Script Generation using Rhetorical Information in a Task Specification Task", IEEE, pp. 2687-2692 (Year: 2006).*

Bhargava et al, "Sentiment Analysis for Mixed Script Indic Sentences", IEEE, pp. 524-529 (Year: 2016).*

"Jenkins CLI," printed Dec. 21, 2021, from https://www.jenkins.io/doc/book/managing/cli/, 8 pages.

Yu Peng et al., "Continuous Integration & Continuous Delivery with Databricks," Oct. 30, 2017, from https://databricks.com/blog/2017/10/30/continuous-integration-continuous-delivery-databricks.html, 14 pages.

"Using User Exits to Extend Oracle Goldengate Capabilities," printed Dec. 21, 2021, from https://docs.oracle.com/en/cloud/paas/goldengate-cloud/gwuad/using-user-exits-extend-oracle-goldengate-capabilities.html#GUID-E3937A3C-2958-49C2-BE39-12F49050E578, 7 pages.

* cited by examiner

FIG. 2

```
{
  "credentials": {
    "username": "hugo",
    "password": "12345",
  "otherData": {
    "abc": "def",
    "subData": {
      "ghi": "jkl"
    }
  }
}
```

Data Structure 302

```
ewogICJjcmVkZW50aWFscyI6IHsKICAgICJ1c2VybmFtZSI6ICJodWdvIiwKICA
gICJwYXNzd29yZCI6ICIxMjM0NSIsCiAgIm90aGVyRGF0YSI6IHsKICAgICJhYm
MiOiAiZGVmIiwKICAgICJzdWJEYXRhIjogewogICAgICAiZ2hpIjogImprbCIKI
CAgIH0KICB9Cn0=
```

Parameter Encoding 304

Shell Script 310

```
#!/usr/bin/env bash

CLASSPATH=/src/:/vars/ execute Main method (params: instaceURL, smokeTestStatusCode,
config encoded as json)
```

Path 312 /usr/bin/groovy   Task Script Name 316 BlueGreenCheck.groovy $1 $STATUS_CODE

```
ewogICJjcmVkZW50aWFscyI6IHsKICAgICJ1c2VybmFtZSI6ICJodWdvIiwKICA
gICJwYXNzd29yZCI6ICIxMjI0NSIsCiAgIm90aGVyRGF0YSI6IHsKICAgICJhYm
MiOiAiZGVmIiwKICAgICJzdWJEYXRhIjogewogICAgICAiZ2VoIjogImlqayIKI
CAgIH0KICB9Cn0=
```

Parameter Encoding 304

Name of CLI task 324   Name of shell script 322 cf deployApp app_name -- smoke-test TEST.sh

Execution Request 320

ENHANCING PARAMETER-LESS EXIT-CALLS FROM A COMMAND LINE INTERFACE

BACKGROUND

Scripts are frequently used in many technical areas including the deployment and testing of software applications. Although scripts that do not take input one or more parameters can still be useful, scripts that can take inputted parameters and thus execute based on those parameters are much more flexible. Accordingly, any environment that restricts or limits the passing of parameters to a script possesses an inherent disadvantage.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enhancing parameter-less exit-calls from a command line interface (CLI). For example, the CLI makes available various tasks for execution. Some of these tasks include an exit-call. During the exit-call, a script may be executed external to the CLI. In one or more embodiments, only the name of the script (or a combination of a path for the script and the name of the script) to be executed can be passed by the CLI to the exit-call. In other words, no parameter beyond the name of the script (or a combination of the path and the name of the script) to be executed can be specified in the exit-call. Accordingly, the exit-call may be referred to as a parameter-less exit-call.

Those skilled in the art, having the benefit of this detailed description, will appreciate that it is often beneficial to execute a script based on parameters. For example, if the script is a smoke test for a newly deployed application, the parameters enable the script to perform a more robust verification of the deployed application. If, as discussed above, the CLI prevents parameters from being passed to the exit-call, the corresponding script cannot be executed based on parameters. Accordingly, this restriction/limitation of the parameter-less exit-call in the CIA is a technical problem.

In one or more embodiments, in order to overcome this restriction/limitation of a parameter-less exit-call, a shell script that includes one or more parameters and an instruction to execute a task script based on those parameters is generated. During execution of the task, the name and possibly the path of the shell script (e.g., instead of the name of the task script itself) is provided to the exit-call. As a result of executing the shell script during the exit-call, the task script itself is executed based on the desired parameters even though the parameters were not (and could not have been) directly passed to the exit-call by the CLI. Accordingly, the generation and use of the shell script is a technical solution to the technical problem(s) of the parameter-less exit-call in the CLI.

Figure 1:
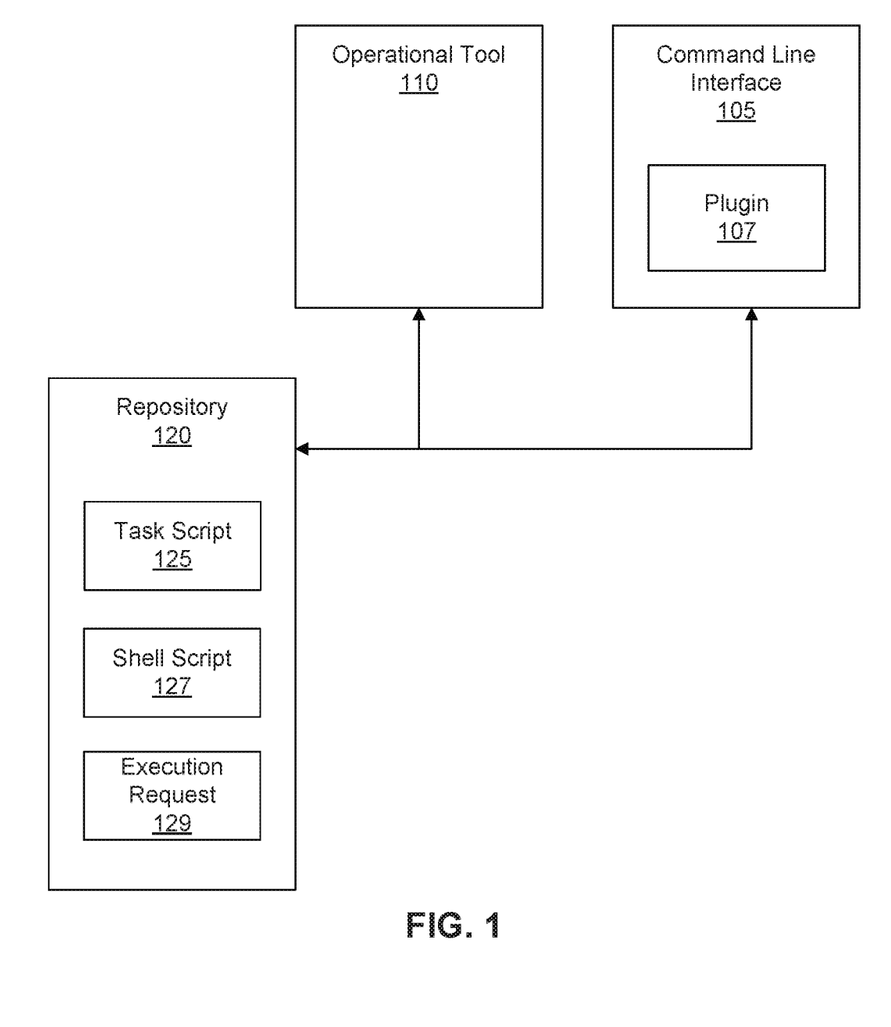
FIG. 1 shows a block diagram of a system for enhancing parameter-less exit-calls from a command line interface in accordance with one or more embodiments.

FIG. 1 shows a system for enhancing parameter-less exit-calls from a command line interface (CLI) in accordance with one or more embodiments. As shown in FIG. 1, the system has multiple components including, for example, a repository 120, an operational tool 110, and a command line interface (CLI) 105. Each of these components (105, 110, 120) may execute on one or more computing devices (e.g., server, mainframe, desktop personal computer (PC), laptop, smart phone, tablet PC, etc.) connected by a network having wired and/or wireless segments. Moreover, two or more of the components (105, 110, 120) may execute on the same computing device.

In one or more embodiments, CLI 105 can be configured to execute one or more tasks. One or more of the tasks available for execution may deploy and/or test new software applications or new versions of existing software applications. Other tasks available for execution may include, but are not limited to, for example, starting or stopping an application, restarting an application, showing recent logs for an application, etc. Other types of tasks may also be available for execution. CLI 105 may receive execution requests identifying which of the available tasks to execute. CLI 105 may publish an application programming interface (API) and the execution requests may be submitted as calls to the API. Additional tasks may be made available by installing plugins (e.g., plugin 107) in CU 105.

In one or more embodiments, some tasks made available by CLI 105 include an exit-call. During the exit-call, a task script (e.g., task script 125) may be executed external to CLI 105. Any output from executing the task script may be returned to CLI 105 for additional processing. In one or more embodiments, the exit-call is referred to as a parameter-less exit-call because only the name of the task script to be executed (or a combination of a path for the task script and the name of the task script) can be passed by CLI 105 to the exit-call. In other words, no parameter beyond the name of the task script to be executed (or a combination of the path and name) can be passed to the exit-call. CLI 105 and\or plugin 107 prevents passing of other parameters to the exit-call.

In one or more embodiments, operational tool 110 is any type of software that can communicate with CLI. 105. For example, operational tool 110 can be software that helps automate the parts of software development related to building, testing, and deploying. In this example, operational tool 110 can facilitate continuous integration, continuous delivery or continuous deployment of software applications.

In one or more embodiments, operational tool 110 is configured to generate shell scripts. These shell scripts may include one or more parameters, an instruction to execute a task script based on the parameters, and a location (e.g., path) of the task script. For example, shell script 127 may include an instruction to execute task script 125 based on one or more parameters. The one or more parameters may be real-time values collected and/or encoded by operational tool 110 including but not limited to, for example, user credentials, website URLs, database names, times, dates, timeout thresholds, etc. For example, the parameters may include multiple credentials to test an application with different user roles, and/or multiple URLs to test different UI entry points in an application, etc.

In one or more embodiments, operational tool 110 is configured to send execution requests (e.g., execution request 129) to CLI 105 (e.g., via an API). As discussed above, an execution request can be a request to execute one of the tasks made available by CLI 105. Accordingly, the execution request may include the name or identity of the task for execution. As also discussed above, some tasks may include an exit-call. If the execution request is for a task that includes an exit-call, the execution request may include the name of the script (or a combination of a path and the name of the script) to be passed to the exit-call for execution during execution of the task.

Assuming it is desired to pass task script 125 to the exit-call for execution, shell script 127 can include an instruction to execute task script 125 based on one or more parameters. In one or more embodiments, the name of shell script 127 is included in execution request 129 instead of the name of task script 125. By specifying shell script 127 instead of task script 125 in execution request 129, it is possible to execute task script 125 based on parameters using the exit-call, even though the exit-call does not permit parameters to be passed (discussed below).

Figure 2:
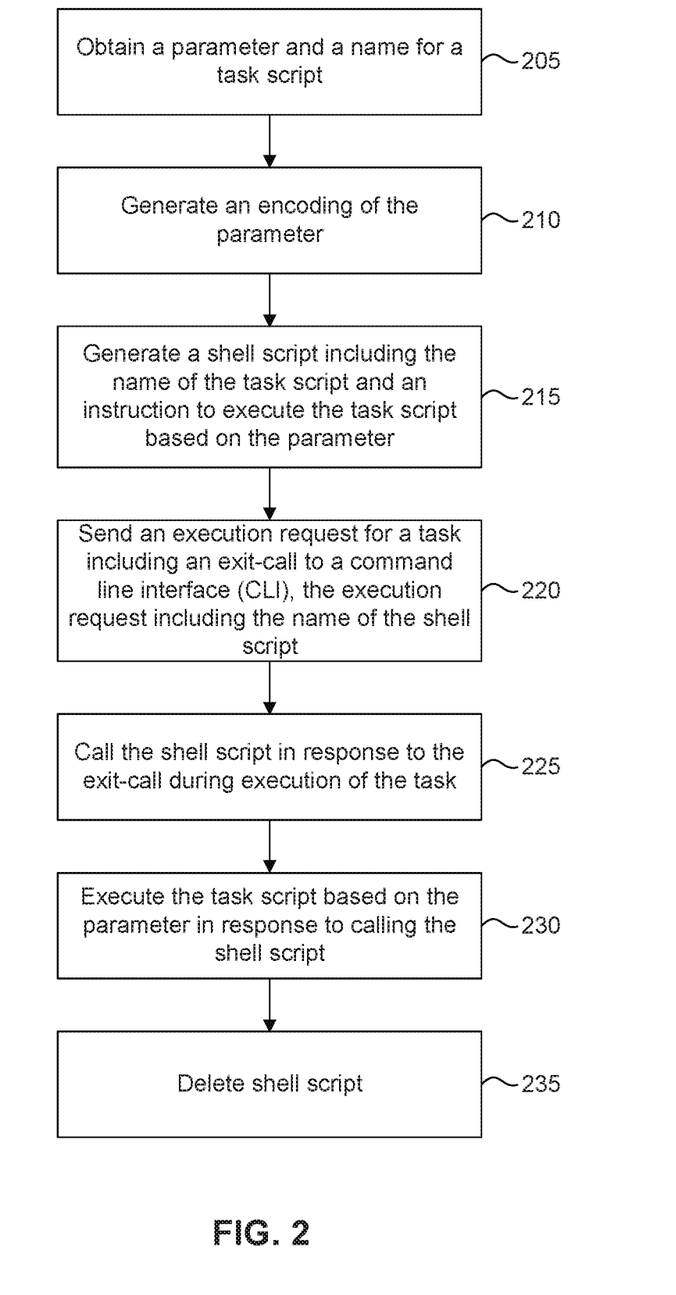
FIG. 2 shows a flowchart for enhancing parameter-less exit-calls from a command line interface in accordance with one or more embodiments.

FIG. 2 is a flowchart for a method 200 for enhancing parameter-less exit-calls from a CLI in accordance with one or more embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 205, operational tool 110 obtains one or more parameters and the name of a task script 125. The one or more parameters may correspond to real time parameters that change over time and thus may have different values every time 205 is executed. One or more of the parameters may be specified inside a data structure (e.g., a JavaScript® Object Notation (JSON®) object) and the parameters are obtained by obtaining the data structure. Example parameters can include, but are not limited to, user credentials, website URLs, database names, times, dates, etc.

Task script 125 may have been generated at any time and by any entity (e.g., third-party software developer) prior to the execution of 205. Task script 125 may be specified by a user (e.g., via graphical user interface (GUI)), in an API call (e.g., API call to the operational tool 110), in code, etc. It is desired that task script 125 be executed based on the parameters. In other words, the one or more parameters may correspond to inputs needed by task script 125 to generate an output. In one or more embodiments, task script 125 corresponds to a smoke test to verify a recently deployed application or a new version of an existing application.

In 210, operational tool 110 encodes one or more of the parameters. If the one or more parameters are in a data structure, encoding the parameters may include encoding the data structure. If the one or more parameters are not in a data structure, encoding the parameters may include adding the parameters to a data structure and then encoding the data structure. Additionally or alternatively, one or more parameters may be encoded without being in a data structure. Multiple parameters may be combined into a single encoding. The single encoding itself may be considered a parameter. Moreover, use of the single encoding of parameters can keep the format of shell scripts consistent across all exit-calls, regardless of the number of parameters. Various encoding schemes may be utilized to encode the parameters as would be appreciated by a person of ordinary skill in the art. For example, binary-to-text encoding such as Base64 may be used to encode the parameters. In one or more embodiments, the encoding scheme may selected such that the encoded parameters do not have any space characters, quotation marks, or other special characters even if the parameters themselves have special characters.

In 215, operational tool 110 generates shell script 127. Shell script 127 can include the one or more parameters and an instruction to execute task script 125 (obtained in 205) based on the one or more parameters. Accordingly, shell script 127 can include the name of task script 125 and the one or more parameters. If the parameters have been encoded, shell script 127 can include the encoding of the parameters or the encoding of the data structure that includes the parameters. Shell script 127 can also include the location (e.g., path) for accessing task script 125.

In one or more embodiments, CLI 105 provides one or more tasks that can be executed on request. The number of tasks available from CLI 105 to be executed can be increased by installing additional plugins to CLI 105. One or more of the tasks may include an exit-call. During the exit-call, a task script may be executed external to CLI 105. Any output from executing the task script may be returned to CLI 105 for additional processing. In one or more embodiments, the exit-call may be referred to as a parameter-less exit-call because only the name of the task script to be executed (or a combination of a path and the name of task script) can be passed by CLI 105 to the exit-call. In other words, no parameter beyond the name of the task script to be executed (or a combination of the path and the name of the task script) can be passed to the exit-call.

In 220, operational tool 110 sends a request to execute a task (execution request 129) to CLI 105. The task includes an exit-call, and execution request 129 identifies the shell script (generated in 215) as the script to be passed to the exit-call. In other words, execution request 129 for the task includes the name of shell script 127 (or a combination of the path and the name of shell script 127). The execution request can be submitted to CLI 105 via an API call. In one or more embodiments, the task pushes a current version of an application being developed in the operational tool 100. Task script 125 can correspond to a smoke test to verify the newly pushed version of the application.

In 225, CLI 105 calls shell script 127 during execution of the task. For example, shell script 127 can be called as part of the exit-call, where the name and possibly path of shell script 127 (e.g., as specified in execution request 129) is passed to the exit-call. As discussed above, in CLI 105, the only parameter that can be passed to the exit-call may be the name of the script (or a combination of the path and the name of the script) to be executed. No other parameters can be passed to the exit-call in CLI 105. CLI 105 (and/or one of its plugins) prevents passing of other parameters to the exit-call.

As discussed above, shell script 127 can include an instruction to execute task script 125 (obtained in 205) in accordance with one or more parameters (obtained in 205). Accordingly, in 230, task script 125 can be executed based on the parameters in response to the shell script being called. If the parameters are encoded (from 210), it may be necessary to decode the parameters before they can be utilized by task script 125. As discussed above, task script 125 can be a smoke test for verifying a deployed software application. Executing task script 125 based on parameters (e.g., user credentials, website URLs, database names, etc.) can allow for a thorough and robust verification of the deployed software application. Executing task script 125 without the parameters can lead to a less thorough and less robust verification of the deployed software application.

Those skilled in the art, having the benefit of this detailed description, will appreciate that if the name of task script 125 (instead of the name of shell script 127) had been passed to the exit-call, it would not have been possible to execute task script 125 based on the collected parameters since only the name of task script 125 (and not the parameters) can be passed to the exit-call. However, by generating shell script 127 with an instruction to execute task script 125 based on the parameters, and then passing the name of shell script 127 to the exit-call, the exit-call can still be used to effectively execute task script 125 based on the parameters. This is an enhancement to the parameter-less exit-call in CLI 105, and as discussed above, a technical solution to a technical problem. For example, the process depicted in FIG. 2 overcomes the restriction(s)/limitation(s) of the exit-call in the CLI.

In 235, operational tool 110 deletes shell script 127 as part of a cleaning process in response to execution of the task.

Figure 3:
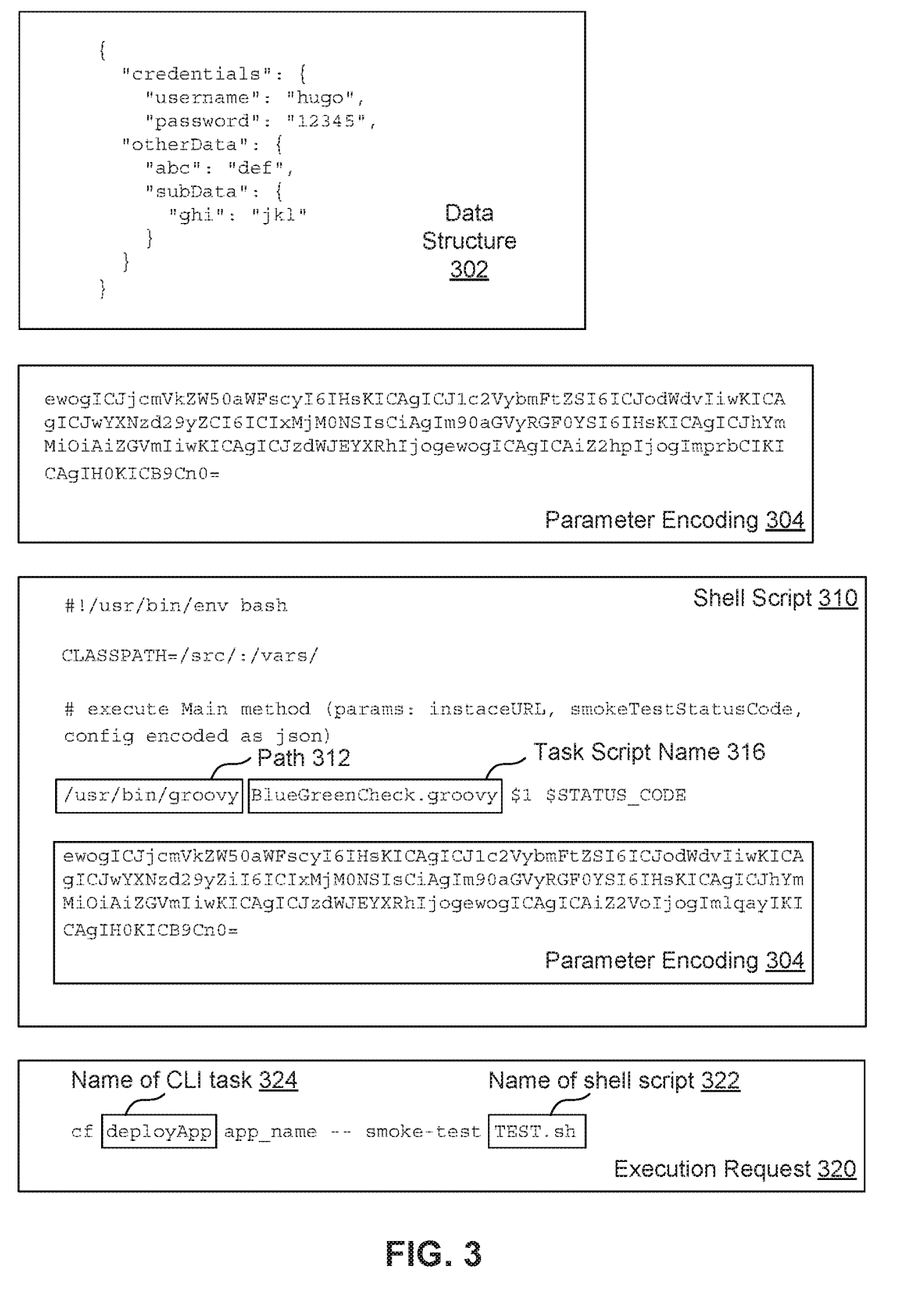
FIG. 3 shows an example of enhancing a parameter-less exit-call from a command line interface in accordance with one or more embodiments.

FIG. 3 shows an example for enhancing a parameter-less exit-call from a CLI in accordance with one or more embodiments. For example, FIG. 3 shows a data structure 302. Data structure 302 is a JSON® object and includes multiple parameters including user credentials (e.g., username, password, etc.). Data structure 302 is an example of how the parameters may be obtained in 205, discussed above in reference to FIG. 2.

Further, FIG. 3 also shows an encoding of the data structure ("parameter encoding") 304. For example, parameter encoding 304 is the result of encoding data structure 302 using Base64 encoding. Parameter encoding 304 is an example result of executing 210, discussed above in reference to FIG. 2.

Further FIG. 3 shows a shell script 310 named "TEST.sh". Shell script 310 includes the name of a task script 316 (e.g., BlueGreenCheck.groovy), a path 312 for the task script, and parameter encoding 304. Shell script 310 also includes an instruction to execute the task script named "BlueGreen-Check.groovy" based on the parameters. Shell script 310 is an example result of executing 215, discussed above in reference to FIG. 2.

Further still, FIG. 3 shows an execution request 320. Execution request 320 includes the name 324 of a CLI task (e.g., "deployApp") to be executed by the CLI. Execution request 320 also includes the name 322 of the shell script (e.g., TEST.sh) to be passed to the exit-call associated with the CU task. Although execution request 320 in FIG. 3 only shows the name 322 of the shell script, in other embodiments, execution request 320 may also include the path of the shell script. The execution request 320 is sent to the CLI. Execution request 320 is an example result of executing 220, discussed above in reference to FIG. 2.

The CLI will execute the "deployApp" task in response to execution request 320. The "deployApp" task includes an exit-call. The CIA can only pass the name of the script to be executed (or a combination of a path and the name of the script) to the exit-call. No other parameters can be passed by the CLI to the exit-call. The CLI will pass "TEST.sh" to the exit-call, as extracted from the execution request 320. As a result, "TEST.sh" will be called by the CLI during execution of the "deployApp" task.

As discussed above, "TEST.sh" includes the parameter encoding 304 and an instruction to execute the task script named "BlueGreenCheck.groovy" based on the parameters in parameter encoding 304. Accordingly, by calling "TEST.sh" as part of the exit-call, the CU is effectively causing the task script named "BlueGreenCheck.groovy" to be executed based on the parameters in parameter encoding 304, even though the CLI did not (and could not) directly pass the parameters to the exit-call.

The process shown in FIG. 2 and the example shown in FIG. 3 may form a portion of an automatic and continuous deployment pipeline implemented in operational tool 105.

Figure 4:
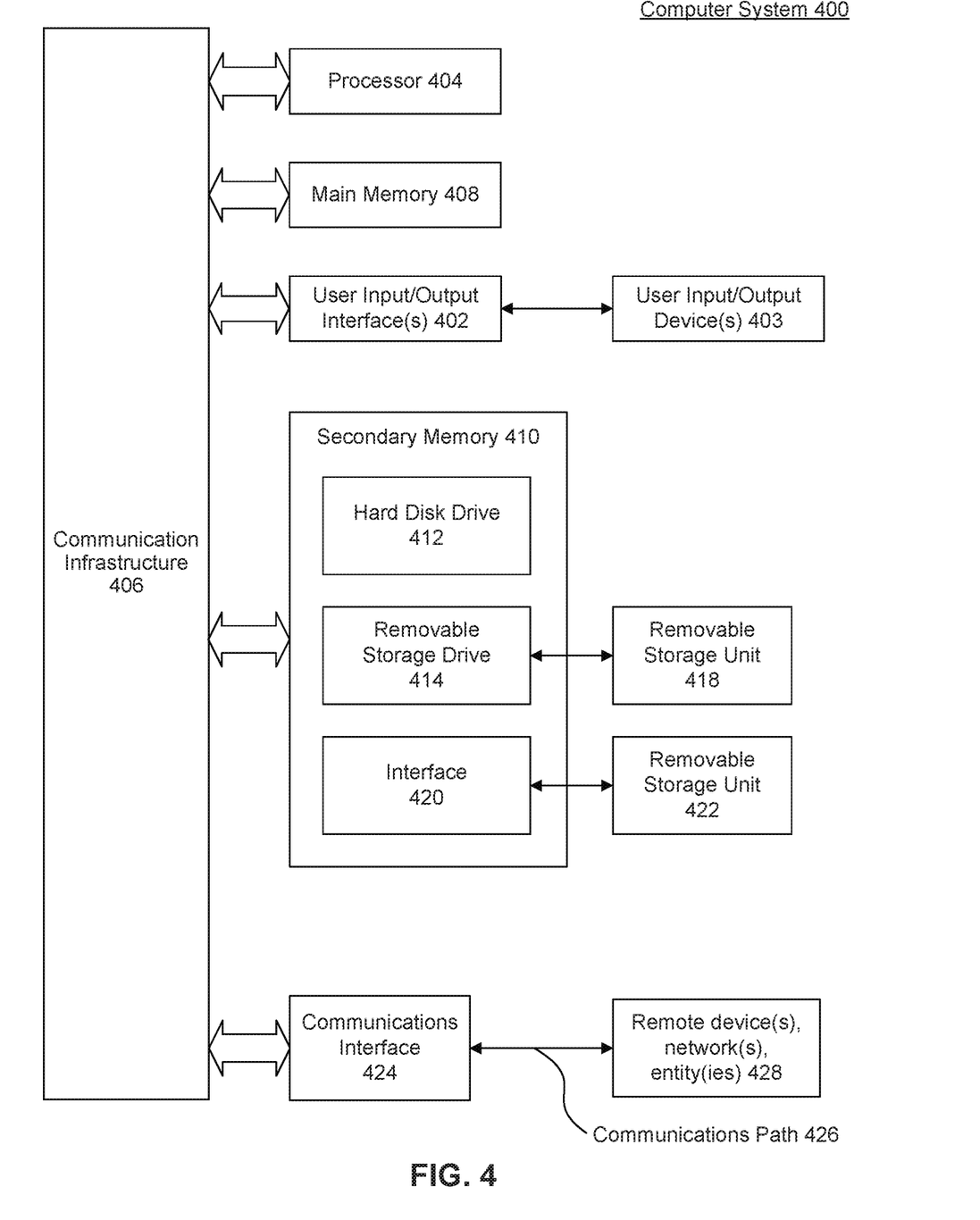
FIG. 4 shows an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript® Object Notation (JSON®), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
obtaining, by at least one processor, a parameter and a name for a task script, wherein the task script is executed based on the parameter;
generating, by the at least one processor, a shell script comprising the name of the task script and an instruction to execute the task script based on the parameter;

sending, by the at least one processor, an execution request for a task comprising an exit-call to a command line interface (CLI), the execution request comprising a name of the shell script for the exit-call, and the CLI prevents passing of any parameter to the exit-call, wherein the CLI calls the shell script in response to the exit-call during execution of the task, wherein the shell script is executed external to the CLI during the exit-call, and the shell script is executed without any parameter, and wherein the task script is executed based on the parameter in response to the CLI calling the shell script; and deleting the shell script following execution of the task.

2. The method of claim 1, wherein the parameter is specified in a data structure, wherein the shell script comprises an encoding of the data structure, and wherein the CLI prevents passing of the parameter to the exit-call.

3. The method of claim 2, wherein executing the task script decodes the encoding of the data structure.

4. The method of claim 2, wherein the data structure is a JavaScript Object Notation (JSON) object, and wherein the encoding is Base64 encoding.

5. The method of claim 2, wherein the parameter is a user credential.

6. The method of claim 1, wherein the task is a deployment process for a current version of an application, and wherein successful deployment of the current version of the application is determined by executing the task script based on the parameter against the current version the application.

7. The method of claim 6, wherein executing the task script against the current version of the application smoke tests the current version of the application.

8. A system, comprising:
a memory; and
at least one processor coupled to the memory and configured to:
obtain a parameter and a name for a task script, wherein the task script is executed based on the parameter;
generate a shell script comprising the name of the task script and an instruction to execute the task script based on the parameter;
send an execution request for a task comprising an exit-call to a command line interface (CLI), the execution request comprises a name of the shell script for the exit-call, and the CLI prevents passing of any parameter to the exit-call,
wherein the CLI calls the shell script in response to the exit-call during execution of the task,
wherein the shell script is executed external to the CLI during the exit-call, and the shell script is executed without any parameter, and
wherein the task script is executed based on the parameter in response to the CLI calling the shell script; and
delete the shell script following execution of the task.

9. The system of claim 8, wherein the parameter is specified in a data structure, wherein the shell script comprises an encoding of the data structure, and wherein the CLI prevents passing of the parameter to the exit-call.

10. The system of claim 9, wherein the data structure is a JavaScript Object Notation (JSON) object, and wherein the encoding is Base64 encoding.

11. The system of claim 8, wherein the task is a deployment process for a current version of an application, and wherein successful deployment of the current version is determined by executing the task script based on the parameter against the current version.

12. The system of claim 11, wherein executing the task script against the current version smoke tests the current version of the application.

13. A non-transitory computer readable device having instructions stored thereon that, when executed by at least one computing device, cause the at least one computing device to perform operations comprising:
obtaining a parameter and a name for a task script,
wherein the task script is executed based on the parameter;
generating a shell script comprising the name of the task script and an instruction to execute the task script based on the parameter;
sending an execution request for a task comprising an exit-call to a command line interface (CLI), the execution request comprising a name of the shell script for the exit-call, and the CLI prevents passing of any parameter to the exit-call,
wherein the CLI calls the shell script in response to the exit-call during execution of the task,
wherein the shell script is executed external to the CLI during the exit-call, and the shell script is executed without any parameter, and
wherein the task script is executed based on the parameter in response to the CLI calling the shell script; and
deleting the shell script following execution of the task.

14. The non-transitory computer readable device of claim 13, wherein the parameter is specified in a data structure, wherein the shell script comprises an encoding of the data structure, and wherein the CLI prevents passing of the parameter to the exit-call.

15. The non-transitory computer readable device of claim 14, wherein executing the task script decodes the encoding.

16. The non-transitory computer readable device of claim 14, wherein the data structure is a JavaScript Object Notation (JSON) object, and wherein the encoding is Base64 encoding.

17. The non-transitory computer readable medium of claim 14, wherein the parameter is a user credential.

18. The non-transitory computer readable device of claim 13, wherein the task is a deployment process for a current version of an application, and wherein successful deployment of the current version is determined by executing the task script based on the parameter against the current version.

19. The non-transitory computer readable device of claim 18, wherein executing the task script against the current version smoke tests the current version of the application.

* * * * *